United States Patent Office 3,823,241
Patented July 9, 1974

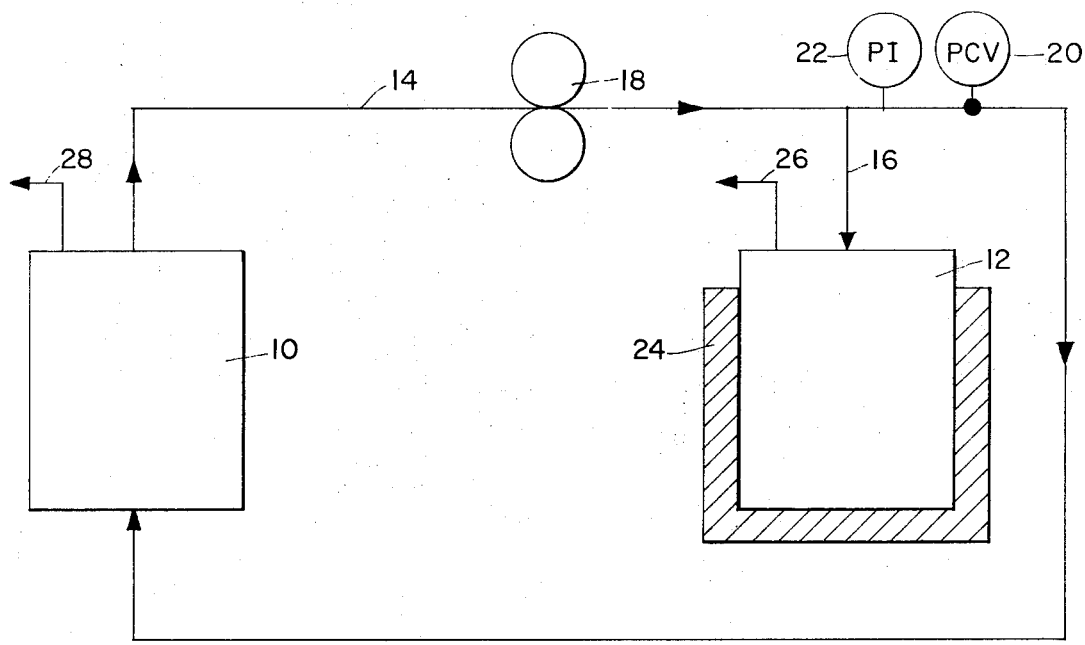

3,823,241
CRYOGENIC AROMATIZATION OF INSTANT COFFEE
Jayantilal Mohanbhai Patel, Cincinnati, and Richard Francis Durchholz, Loveland, Ohio, assignors to The Procter & Gamble Company, Cincinnati, Ohio
Continuation of abandoned application Ser. No. 74,074, Sept. 21, 1970. This application Aug. 17, 1972, Ser. No. 281,569
Int. Cl. A23f 1/04
U.S. Cl. 426—386
17 Claims

ABSTRACT OF THE DISCLOSURE

A method of transferring the aroma of roast and ground coffee to a coffee absorbant such as an instant coffee to which coffee oil has been added. The method comprises chilling the absorbant to a temperature of at least —40° F. and placing the chilled absorbant in communication with a zone charged with roast and ground coffee held at a higher vapor pressure than the vapor pressure of the chilled absorbant. The aroma essence of the roast and ground coffee is transferred to the chilled absorbant and retained thereon.

CROSS-REFERENCE

This application is a continuing application of "Cryogenic Aromatization of Instant Coffee," Ser. No. 74,074, filed Sept. 21, 1970 and now abandoned.

BACKGROUND OF THE INVENTION

Typical instant coffee processing generally involves three basic steps: countercurrently extracting roast and ground coffee with aqueous extraction liquor, concentrating the resulting extract, preferably to at least a 50% solubles concentration, and finally, drying the extract to provide a dry instant coffee product. In line with the continuing effort towards an instant coffee product with exact vapor duplication of roast and ground coffee, from time to time various process improvements have been made upon these three basic hereinbefore described steps. Some of these process improvements which have been designed to specifically improve the aroma of roast and ground coffee include steam distillation of volatiles from roast and ground coffee prior to extraction and adding back the distillate after extract concentration; expressing coffee oil from roast and ground coffee, and adding expressed coffee oil back to an instant coffee process stream; and cryogenically collecting coffee aromas in a liquid condensate form and adding such a condensate to an instant coffee product or a precursor thereof such as is done in U.S. Pats. 3,021,218, 3,406,074, 2,680,687 and 3,244,533.

While the prior art as exemplified by the above cited patents shows that cryogenic trapping of coffee essence is not new to the art, each of the methods described in the above cited prior art patents is deficient in that it has been found that while an excellent aroma is initially obtained, any instant coffee which has been aromatized with the trapped aromas retains the roast and ground coffee aroma only for short periods of time. Therefore, after one or two consumer uses, which of course involve opening of the instant coffee package and allowing aroma to escape, the essential aroma of the roast and ground coffee has been completely depleted and the remaining instant coffee is without aroma.

Instant coffees as presently marketed are either practically odorless or do not provide an aroma substantially similar to roast and ground coffee, or if they do provide such an aroma it is present only for a fleeting moment; it is felt that this fact has been of major significance in some consumer resistance to instant coffee products. For, as any roast and ground coffee drinker knows, when a container of roasted and ground coffee is opened a pleasing aroma of freshly ground coffee is immediately sensed.

A primary object of this invention is to provide an instant coffee which at the time of consumer use will provide the consumer with the aroma of freshly ground roasted coffee. Another primary object of this invention is to provide an instant coffee which not only has the aroma of roast and ground coffee but which will retain that aroma in the instant coffee package or jar after consistent and frequent consumer use.

Yet another object is to provide a cryogenic process of obtaining roast and ground coffee aroma and of placing that aroma on instant coffee or other absorbant materials by a method which does not employ separate coffee essence condensation steps, and by a method which for some unknown reason provides an aroma which is retained for great lengths of time by the instant coffee.

These and other objects will become apparent from the following description of the process of this invention.

SUMMARY OF THE INVENTION

This invention relates to a method of transferring the aroma of roast and ground coffee to a coffee aroma absorbant material such as instant coffee having coffee oils sprayed thereon, coffee oil *per se*, liquid glycerides, concentrated coffee extract, and emulsions of coffee oil with liquid glycerides and/or concentrated coffee extract. The method comprises chilling the absorbant to a temperature of at least —40° F. and preferably —150° F., and placing the chilled absorbant in communication with a zone charged with roast and ground coffee held under conditions which provide a higher vapor pressure than the vapor pressure of the chilled absorbant so as to create a positive pressure differential in the direction of the absorbant. Because of the pressure differential, the aroma essence of the roast and ground coffee is transferred to the chilled absorbant, and importantly, when the process of this invention is utilized as opposed to prior art cryogenic processes, the absorbant retains the roast and ground coffee aroma for long periods of time.

BRIEF DESCRIPTION OF THE DRAWING

The figure is a flow chart showing one method and specific apparatus for practicing the process of this invention.

DETAILED DESCRIPTION OF THE INVENTION

The initial step of the process of this invention comprises chilling the material to which the roast and ground coffee aroma is to be transferred, hereinafter referred to as an absorbant, to a temperature of at least —40° F. Thereafter the chilled absorbant is placed in communication with a zone charged with roast and ground coffee held at higher temperatures and therefore having a higher equilibrium vapor pressure than that existing between the chilled absorbant and its vapor. Accordingly, a positive pressure differential is created in the direction of the absorbant and the roast and ground coffee aroma is transferred to the absorbant.

As is well known, the total pressure in any closed system is equal to the sum of the partial pressures of components in that system and where two different materials are maintained within a closed system and each material is maintained at differing conditions of temperature and vapor pressure, a positive pressure force exists in the direction of from the greater pressure to the lesser pressure. Further, for any given set of temperature and pressure conditions there exists a state of dynamic equilibrium between any solid or liquid material and the gaseous molecules of that material. The higher the temperature, the greater the vapor pressure, and the higher the exerted pressure the higher the partial pressure in relation to the vapor pressure. Thus, by increasing the exerted pressure one can induce condensation. The process of this invention makes use of these fundamental physical principles in a manner which transfers the aroma of roast and ground coffee to a coffee aroma absorbant in such a manner that the aroma which has been transferred to the absorbant is unexpectedly retained by the absorbant for long periods of time.

Again, as previously mentioned, the initial step comprises chilling the absorbant to which the coffee aroma is to be added to a temperature of at least —40° F. The absorbant must be chilled to a temperature of at least —40° F. in order to provide a sufficiently low enough temperature to insure that the aroma of the roast and ground coffee is in fact transferred to the absorbant. At temperatures above —40° F. little if any of the roast and ground coffee aroma is transferred to the absorbant. From the standpoint of process efficiency and best aroma results it is preferred that the absorbant to which the coffee aroma is to be added be chilled to a temperature of at least —150° F.

Cooling media capable of providing the required minimum chilled absorbant temperature of —40° F. and the preferred minimum of —150° F. are well known and generally can be such materials as liquid nitrogen (—320° F.), liquid oxygen (—297° F.), liquid air (—318° F.) and the like. From the standpoint of availability, it is preferred that the cooling medium utilized to chill the absorbant to which the coffee aroma is to be added be liquid nitrogen.

The above description of the initial chilling of the material to which the roast and ground coffee aroma is to be transferred has been given in connection with the generic term "absorbant." This term as defined herein is intended to include materials selected from the group consisting of instant coffee which has an oil sprayed thereon at a level of at least 0.05% by weight of the instant coffee, coffee oil *per se*, liquid glycerides, concentrated coffee extract, and emulsions of coffee oil with liquid glycerides and/or concentrated coffee extract. Employment of each of these described materials as the absorbant to which the roast and ground coffee aroma is to be transferred has specific advantages not only from the standpoint of overall processing, but from the standpoint of providing an instant coffee product having the aroma of roast and ground coffee which is present on the initial as well as successive openings of the instant coffee containing vessel. In other words, the aromatized instant coffee is characterized by retaining the roast and ground coffee aroma after successive jar openings. A brief description of each of these absorbant materials will now be given.

Where the absorbant material is instant coffee, no criticality exists in regard to the precise instant coffee employed. The instant coffee is generally prepared by utilizing the three basic hereinbefore described steps of extracting roast and ground coffee, concentrating the extract, and drying the extract. The instant coffee can be either a spray-dried product, a foam-dried product, or a freeze-dried product. However, if the absorbant material is instant coffee, it has been found essential that the instant coffee must have at least 0.05% by weight of the instant coffee of an oil sprayed on the instant coffee in order for the roast and ground coffee aroma which is transferred thereto to be retained so that upon successive openings of the instant coffee package the consumer continues to be greeted by an intense olfactory impact of roast and ground coffee. A practical upper limit of oil present on the instant coffee which is to act as an absorbant in the process of this invention is 1.5% by weight of the instant coffee. A preferred range of oil is from 0.1% to 0.8% by weight of the instant coffee absorbant. The preferred oil is coffee oil; however, liquid glycerides, explained further in detail below, are capable of acting as the oil also.

Roasted coffee contains about 10%–12% coffee oil and, as mentioned previously, this coffee oil may act as the absorbant material in the process of this invention. When coffee oil *per se* is utilized, the coffee oil is obtained either by solvent extraction or by use of a coffee oil expeller. The more commonly used method is the expeller method, in which case roasted and ground coffee is subjected to very high pressures to squeeze out or expel the coffee oil which is collected and saved for utilization in add-back aromatization in instant coffee processing. Preferably the coffee oil is purified coffee oil obtained by refining of crude coffee oil, for example, as described in U.S. Pat. 2,542,119. For further details in regard to coffee oil collection processes, see Sivetz, *Coffee Processing Technology*, Vol. 2, Avi Publishing Co., 1963, pages 23 through 32.

Liquid glycerides suitable for use as the absorbant material in the process of this invention are well known, and generally comprise all liquid or semi-liquid glyceride shortenings derived from animal, vegetable, or marine fats and oils, including synthetically prepared shortenings. These glycerides can contain saturated or unsaturated "long chain" acyl radicals having from about 12 to about 22 carbon atoms such as lauroyl, lauroleoyl, myristoyl, myristoleoyl, palmitoyl, palmitoleoyl, stearoyl, oleoyl, linoleoyl, linolenoyl, arachidoyl, arachidonyl, behenoyl, erucoyl, and the like, and are generally obtained from edible fats and oils such as cottonseed oil, soybean oil, coconut oil, rapeseed oil, peanut oil, olive oil, palm oil, palm kernel oil, sunflower seed oil, rice bran oil, corn oil, sesame seed oil, safflower oil, wallflower oil, nasturtium seed oil, whale oil, sardine oil, herring oil, menhaden oil, pilchard oil, lard, tallow and the like. These glycerides can also contain, in part, one or two short chain acyl groups having from 2 to about 6 carbon atoms such as acetyl, propanoyl, butanoyl, valeryl, and caproyl; they can be prepared by random or low-temperature interestification reactions of fatty triglyceride-containing oils and fats, such as interesterified or rearranged cottonseed oil and lard; and they can be otherwise formed by various organic syntheses.

Another material capable of acting as the coffee aroma absorbant in the process of this invention is concentrated coffee extract obtained from the hereinbefore briefly described instant coffee manufacturing process. When coffee extract is utilized as the absorbant material, it is important that the extract be concentrated in order to have a good degree of aroma retention after adding back to instant coffee. Best results are obtained when the extract is concentrated to a concentration of at least 40% solubles and preferably to a concentration of at least 60% solubles. When concentrated extract is the absorbant, it is preferably added back to dry instant coffee at a level of from 5% to 15% by weight of the dry instant coffee.

An additional absorbant material comprises emulsions of coffee oil with liquid glycerides and/or concentrated coffee extract. The concentrated extract portion of the emulsion, when employed, has the solubles concentrations previously given in connection with utilization of concentrated coffee extract *per se* as the absorbant material. When such emulsions are used as the absorbant, they are preferably added back to the dry instant coffee at a level of from 2% to 10% by weight of the instant coffee.

The preferred absorbants from the standpoint of best aroma retentions are oils *per se* such as coffee oil and liquid glycerides and instant coffee having at least 0.1% by weight of an oil sprayed thereon.

When the absorbant material to which the aroma of roast and ground coffee is to be transferred is a liquid, as in the case of coffee oil *per se,* liquid glycerides, concentrated coffee extracts, and emulsions of coffee oil and liquid glycerides and/or concentrated extract, it is preferred that the absorbant be chilled by pouring the absorbant directly into a cryogenic fluid such as liquid nitrogen. When the edible oil, which is preferably at room temperature, is poured into a cryogenic fluid, because of the wide temperature differential several important things occur. Because of the extremely low temperature of the cryogenic fluid, the edible oil virtually instantly freezes and fractures into very small particles, providing a frozen finely divided oil-cryogenic fluid slurry. While this rapid freezing and simultaneous fracturing is occurring, the cryogenic fluid is simultaneously evaporating which results in a very highly porous structure within the divided frozen oil particles. The resulting finely divided frozen oil particles with a highly porous structure are especially suitable for incorporation of aroma because the fine state of particle subdivision allows for maximum contact between an aroma frost and the frozen oil, and the very porous nature of the divided particles allows for ease of incorporation of aroma frost into the oil itself. The cryogenic fluid utilized in this first step can be any of the conventionally known cryogenic fluids such as liquid nitrogen, liquid air, liquid oxygen, liquid hydrogen, liquid helium, and the like. However, the most easily obtained and perhaps one of the most inert cryogenic fluids is liquid nitrogen, and it is therefore preferred from the standpoint of availability as well as safety during use. Of course, other cryogenic fluids, as should be apparent to those skilled in the art, can also be employed with satisfactory performance results. Of course, where the absorbant material is instant coffee having coffee oil sprayed thereon, the instant coffee has a large surface area and, accordingly, the instant coffee is chilled to the required temperatures by placing the instant coffee within a vessel which is in contact with the cooling medium.

In order to transfer the aroma of roast and ground coffee to the coffee aroma absorbant, the absorbant, chilled to temperatures as previously described, is placed in communication with a zone charged with roast and ground coffee. Because the roast and ground coffee is not cooled to low temperatures as is the chilled absorbant, the vapor pressure of the volatiles of the roast and ground coffee, which are in equilibrium with the roast and ground coffee, is higher than the vapor pressure of the volatiles above the chilled absorbant which are in equilibrium with the absorbant; and accordingly, a positive pressure driving force is created in the direction of the absorbant. As used herein, the phrase "in communication with" means that the roast and ground coffee from which the aroma is to be transferred and the chilled absorbant to which the aroma is to be transferred are both contained within the same closed system in such a manner that a free exchange of vapors between them can occur.

Of course, the greater the equilibrium vapor pressure above the roast and ground coffee and the lower the vapor pressure above the absorbant material, the greater will be the driving force in the direction of transferring volatile aromas from the roast and ground coffee to the absorbant material. In other words, the greater the pressure differential between the high vapor pressure of the volatiles in equilibrium with the roast and ground coffee and the low vapor pressure of the volatiles in equilibrium with the absorbant material, the greater will be the transfer of aroma volatiles to the absorbant.

As will be more fully explained in connection with the examples, and when describing the drawing, the utilization of a compressor placed in the middle of the communicating conduit between the roast and ground coffee and the absorbant material further increases the exerted pressure above the absorbant material which of course increases the partial pressure above the absorbant material, and therefore further increases the driving force for aroma transfer to the absorbant. Because the utilization of a compressor is advantageous from the standpoint of process efficiency in that it decreases processing times, it is therefore preferred. It is preferred that where pressure is employed, that the pressure be from 1 p.s.i.g. to 500 p.s.i.g., and preferably within the range of from 5 p.s.i.g. to 50 p.s.i.g.

In addition, the pressure differential between the partial pressure above the roast and ground coffee and the partial pressure above the absorbant material to which the roast and ground coffee aroma is to be transferred can be increased by a mild heating of the roast and ground coffee. However, as those skilled in coffee production know, any heating of roast and ground coffee increases the propensity for the aroma volatiles to be deteriorated by induced chemical reaction, and accordingly it is preferred that the roast and ground coffee be held at ambient conditions. If heating is to be employed, it is essential that the roast and ground coffee not be heated to temperatures in excess of 180° F. for it has been found that temperatures in excess of 180° F. greatly enhance the propensity for aroma deterioration. Preferably, where heating is employed, the roast and ground coffee is heated to temperatures not in excess of 150° F.

As a further means of insuring against oxidative deterioration of the roast and ground coffee aroma, as well as a means of further increasing the partial pressure differential between the roast and ground coffee and the partial pressure above the absorbant material, it is preferred that the zone within which the communication between the roast and ground coffee and the absorbant material is to occur, be purged of all air. However, such purging of air is not essential but only preferred. In addition, an inert carrier gas such as nitrogen may be circulated through the system in order to further aid in transferring the aroma of roast and ground coffee to the absorbant material. The use of such a carrier gas is preferred because it substantially reduces process time.

In regard to process times, there is no criticality with regard to the exact time that the roast and ground coffee is held in communication with the absorbant material, as the precise time depends upon the aroma intensity desired in the absorbant material. Generally, satisfactory aroma intensities are obtained in from 0.5 minutes to 45 minutes, and preferably, in from 1 minute to 10 minutes. However, if desired, times longer than 45 minutes can be employed, and therefore the upper time limitation of 45 minutes is merely a practical one.

No criticality exists with regard to the amount of roast and ground coffee utilized relative to the amount of absorbant material utilized. Of course, optimum proportions will vary depending upon what the absorbant material is. Where the absorbant material is instant coffee oil *per se* or liquid glycerides or concentrated coffee extract, or emulsions of coffee oil with liquid glycerides and/or concentrated extract, it is preferred that the weight ratio of roast and ground coffee to the absorbant material be within the range of 1000:1 to 10:1 and preferably from 200:1 to 500:1. However, where the absorbant material is instant coffee having oil already sprayed thereon, and which after aromatizing is immediately ready for packing, the weight ratio of roast and ground to the absorbant material can be considerably less and from a practical standpoint must be considerably less. In this instance, the weight ratio of roast and ground coffee to absorbant is within the range of from 0.5:1 to 5:1 with a preferred upper limit of 3:1.

No criticality exists with regard to the particle size of the roast and ground coffee to be used herein, and it may be regular grind, drip grind, fine grind or espresso grind as these grind sizes are defined in the 1948 simplified Practice Recommendation by the U.S. Department of Commerce (see "Coffee Brewing Workshop Manual," p. 33, published by the Coffee Brewing Center of the Pan American Coffee Bureau). However, it has been found that the finer the grind size the more effective is aroma transfer, and therefore fine grind and espresso grind are preferred. The escaping aroma of cell-disrupted coffee, i.e. flaked coffee which has nearly 100% cell disruption, has also been found preferable from the standpoint of a highly effective aroma source. Grinder gas can also be employed as an aroma source.

Coffee aroma can be thought of as having two distinct characteristics, i.e. intensity and character. The aroma intensity is a measure of the initial impact and aroma strength when first smelling an aroma. It is, in fact, with respect to this invention, a measure of how well the aroma of roast and ground coffee is transferred to and retained by the absorbant material. Aroma intensity is to be distinguished from aroma character which, with regard to this invention, is controlled by the blend of roast and ground coffee utilized in the process of this invention. For example, if the blend comprises largely Robusta coffees the aroma character of the absorbant material after the aroma has been transferred thereto will be largely the typical aroma notes of Robustas and will be characterized as "earthy" and "fuzzy" in notes. On the other hand, if the roast and ground coffee from which the aroma is to be transferred to the absorbant material is a blend which comprises largely high grade Arabica coffees, the aromatized absorbant material will have an aroma character which is characterized as "sweet," "aromatic," and "fruity." In most situations the roast and ground coffee will be a blend of high, low, and intermediate quality coffees. However, if desired the roast and ground coffee can be all of a single quality, i.e. high quality beans.

In further regard to aroma intensity, it should be mentioned that utilization of the process of this invention actually can provide in the absorbant material and an instant coffee which has been aromatized therewith at the levels previously specified, a roast and ground coffee aroma intensity which is initially greater than the roast and ground aroma intensity of roast and ground coffee itself.

As previously indicated, in addition to providing and transferring excellent roast and ground coffee aroma intensity to the absorbant material, the process of this invention is further characterized by some unknown phenomena which allow the aromatized instant coffee to retain that aroma for long periods of time. This high retention factor is very important because as the consumer utilizes instant coffee over a period of days or weeks, each successive opening of the jar containing that instant coffee allows more and more aroma to escape and, accordingly, unless the instant coffee has a high aroma retention factor, after one or two jar openings the instant coffee becomes essentially odorless. In fact, with instant coffees presently on the market, it has been found that they generally are substantially without roast and ground coffee odor or anything approaching roast and ground coffee odor after 3 to 5 jar openings.

Both the aroma initial intensity and the aroma retention factor of the absorbant material or of instant coffee having the absorbant material sprayed thereon, is measured by an open aging test. In this test, jars of aromatized instant coffee are opened four times a day for approximately three days in an effort to approximate normal consumer usage. After each opening the jar is sniffed by a panel of coffee aroma evaluation experts and the intensity of the aroma is indicated on a scale of from 0 to 10. Zero represents the aroma intensity of a conventional 100% spray-dried instant coffee, and 10 represents the initial aroma intensity, i.e. upon first jar opening, of a blend comprising 100% vacuum coffee. Eight represents the initial aroma intensity of a blend comprising ⅔ vacuum coffee and ⅓ instant coffee; 5 represents the initial aroma intensity of ⅓ vacuum coffee and ⅔ instant coffee, and 3 represents the initial aroma intensity of 5% vacuum and 95% instant coffee. In the examples the values given represent the average for a panel of four expert aroma analysts.

The following examples are offered to further illustrate, but not limit, the process and objects of this invention. Unless specified to the contrary, all ratios are given as weight ratios and all temperatures are temperatures of the roast and ground coffee and/or the absorbant material per se, and not that of the vessel or heat exchange medium.

The examples will be described in connection with the drawing. In the drawing there are shown two vessels 10 and 12 which are placed in communication by communicating conduit or line 14, and line 16. Midway between vessels 10 and 12, line 14 is interrupted by compressor 18. Compressor 18 and pressure control valve 20 along with pressure gauge 22, are utilized to control the pressure within vessel 12. Vessel 12 contains the absorbant and is placed within a cooling bath 24 of the chilling media, for example liquid nitrogen. Lines 26 and 28 are utilized to evacuate the absorbant-containing vessel 12 and the roast and ground coffee-containing vessel 10, respectively. If desired, the closed system may contain an inert carrier gas such as nitrogen which is continuously circulated from vessel 10 into line 14, past line 16 and again into vessel 10. Because of the extremely low vapor pressure above the absorbant contained in vessel 12, a positive pressure differential is created such that roast and ground coffee aroma leaves vessel 10, travels into line 14, and into line 16 and onto the absorbant material.

If desired, means (not shown in the drawing) of agitating both vessels 10 and 12 can be employed. From the standpoint of process efficiency, it is preferred that both vessels 10 and 12 be continuously agitated during the aromatization process.

Example 1

Eight pounds of instant coffee having .04 pounds of coffee oil sprayed thereon (0.5% by weight) is placed in vessel 12. The instant coffee contained in vessel 12 is cooled to −250° F. by liquid nitrogen bath 24. After cooling, the pressure within vessel 12 was 28 inches absolute. 20 pounds of regular grind roast and ground coffee comprising a blend of 25% high quality Arabicas, 43.75% Brazils, 6.25% low quality Arabicas and 25% Robustas was placed in vessel 10. Vessel 10 was held at ambient temperature (approximately 70° F.) and was evacuated through line 28 to an absolute pressure of 19 inches of mercury to purge the system of air. Vessel 10 was continuously rotated for 15 minutes to allow regeneration of the pressure in vessel 10. The weight ratio of roast and ground coffee to instant coffee absorbant was 5:2. Compressor 18 and pressure control valve 20 were adjusted to create a pressure of 5 p.s.i.g. within vessel 12. The roast and ground coffee and the instant coffee absorbant were allowed to continue in communication for 5 minutes. The amount of aroma vapor transferred to the instant coffee absorbant contained in vessel 12 was 1.15 cubic feet/pound of instant coffee.

Thereafter, the aromatized instant coffee was inert gas packed at −40° C. in small jars which were utilized in open aging tests.

An open aging test was conducted exactly as previously described in an earlier portion of the specification. The results of that test are summarized in the following Table.

|  |  | Openings | | | | | | | | | | | |
|---|---|---|---|---|---|---|---|---|---|---|---|---|
| Standards | Intensity | 1 | 2 | 3 | 4 | 5 | 6 | 7 | 8 | 9 | 10 | 11 | 12 |
| 100% vac.* | 10 | 15 | 11 | | | | | | | | | | |
|  | 9 | | | | | | | | | | | | |
| 2/3 vac | 8 | | | 8 | | | | | | | | | |
|  | 7 | | | | | | | | | | | | |
|  | 6 | | | | | 6 | | | | | | | |
| 1/3 vac | 5 | | | | 5 | | | | | | | | |
|  | 4 | | | | | | 4 | 4 | 4 | 4 | 4 | 4 | 4 |
| 5% vac | 3 | | | | | | | | | | | | |
|  | 2 | | | | | | | | | | | | |
|  | 1 | | | | | | | | | | | | |
| 100% instant** | 0 | | | | | | | | | | | | |

\* "Vac." is an abbreviation meaning roast and ground coffee comprising the blend described in Example 1.
\*\* 100% spray-dried instant coffee having .5% by weight coffee oil sprayed thereon.

As can be seen from the Table the initial aroma intensity of the instant coffee aromatized by the process of this invention was actually judged to be greater than the initial aroma intensity of roast and ground coffee. Likewise, the second jar opening showed a greater aroma intensity than roast and ground coffee. After 5 jar openings the aroma intensity leveled off at a value of 4 which is still substantially greater than the aroma of conventional instant coffee.

Example 2

100 pounds of the roast and ground coffee described in Example 1 was placed in vessel 10, and vessel 10 was evacuated through line 28 to an absolute pressure of 5 inches of mercury to purge the system of air. The vessel was held at room temperature (about 75° F.) for 16 hours. Vessel 12 was held in a liquid nitrogen bath 24 and .5 pounds of coffee oil, which had been frozen and granulated by dropping coffee oil directly into liquid nitrogen, was placed in vessel 12. The temperature of the coffee oil was −300° F. The weight ratio of roast and ground coffee to coffee oil absorbant was 200:1. Compressor 18 and pressure control valve 20 were adjusted such that the pressure within vessel 12 was 5 p.s.i.g. Vessels 10 and 12 and the roast and ground coffee and coffee oil contained respectively therein, were placed in communication for 6 minutes. Thereafter, liquid nitrogen bath 24 was removed and vessel 12 was allowed to come to ambient conditions. The coffee oil contained in vessel 12 was dripped on instant coffee at a level of .5% by weight of the instant coffee. The aromatized instant coffee was packed as previously described in Example 1.

Example 3

The process of Example 2 was repeated with the following changes. In place of the coffee oil absorbant of Example 2, refined, bleached, and deodorized soybean oil having an iodine value of 107 was utilized. Soybean oil is a liquid glyceride.

Example 4

The process of Example 1 was repeated utilizing as the absorbant instant coffee having sprayed thereon .5% by weight of the instant coffee, of the soybean oil of Example 3.

Example 5

Example 5 was run utilizing the exact conditions of Example 3 except for the following changes. The absorbant was a concentrated coffee extract having a solubles concentration of 50%. The aromatized concentrated extract was dripped on instant coffee at a level of 5.0% by weight of the dry instant coffee.

Example 6

The process of Example 3 was repeated except for the following changes. The absorbant material comprised an emulsion of 50% solubles concentration extract and coffee oil. The weight ratio of extract to coffee oil was 1:1 and the amount of emulsion absorbant added back to the instant coffee was 5% by weight of the instant coffee.

In the above Example, where the closed system represented by vessels 10 and 12 and line 14 contains nitrogen as a carrier gas, substantially similar results are obtained. However, process times are reduced by about 20%. Identical results are obtained when the emulsion of Example 6 is replaced with an emulsion of soybean oil, a liquid glyceride, and coffee oil.

In each of Examples 2 through 6, open aging tests produce results nearly identical with those shown in Example 1. However, it is noted that when using concentrated extract or emulsions of coffee oil and extract or emulsions of coffee oil and liquid glycerides as the absorbant that the aroma intensity decreases faster and levels off at a value slightly less than when instant coffee having oil sprayed thereon or coffee oil *per se* or liquid glycerides *per se* are used as the absorbant.

What is claimed is:

1. A method of transferring the aroma of roast and ground coffee to a coffee aroma absorbant selected from the group consisting of coffee oil, liquid glyceride, concentrated coffee extract, and emulsions of coffee oil with concentrated extract and/or liquid glycerides, said method comprising:
   (a) chilling the absorbant to a temperature of at least −40° F. by pouring said absorbant directly into a cryogenic fluid whereby the absorbant is quickly frozen and fractured into finely subdivided frozen particles;
   (b) placing the chilled absorbant in communication with a zone charged with roast and ground coffee held at a higher vapor pressure than the vapor pressure of the chilled absorbant so as to create a positive pressure differential of the volatile components in the direction of the absorbant; and
   (c) holding the absorbant under an exerted pressure of from 1 p.s.i.g. to 500 p.s.i.g.;

whereby the aroma essence of roast and ground coffee is transferred to the chilled absorbant and retained thereon.

2. The process of Claim 1 wherein the cryogenic fluid is selected from the group consisting of liquid nitrogen, liquid air, liquid oxygen, liquid hydrogen, and liquid helium; and the exerted pressure above the absorbant is from 5 p.s.i.g. to 50 p.s.i.g.

3. The process of Claim 1 wherein the absorbant is frozen granulated coffee oil.

4. The process of Claim 3 wherein the ratio of roast and ground coffee to coffee oil is from 1000:1 to 10:1.

5. The process of Claim 4 wherein the ratio of roast and ground coffee to coffee oil is from 200:1 to 500:1.

6. The process of Claim 1 wherein the absorbant is frozen granulated liquid glyceride.

7. The process of Claim 6 wherein the ratio of roast and ground coffee to liquid glyceride is from 1000:1 to 10:1.

8. The process of Claim 7 wherein the ratio of roast and ground coffee to liquid glyceride is from 200:1 to 500:1.

9. The process of Claim 1 wherein the absorbant is concentrated coffee extract having a solubles concentration of at least 40%.

10. The process of Claim 9 wherein the solubles concentration is at least 60%.

11. The process of Claim 1 wherein the roast and ground coffee is held at a temperature of less than 180° F.

12. The process of Claim 11 wherein the roast and ground coffee is held at a temperature of less than 150° F.

13. The process of Claim 12 wherein the roast and ground coffee is held at ambient temperatures.

14. The process of Claim 1 wherein the zone charged with roast and ground coffee is purged of air.

15. The process of Claim 1 wherein the zone within which the chilled absorbant is placed in communication with the roast and ground coffee is charged with a carrier gas.

16. The process of Claim 1 wherein the chilled absorbant is held in communication with the roast and ground coffee for from 0.5 minutes to 45 minutes.

17. The process of Claim 16 wherein the chilled absorbant is held in communication with the roast and ground coffee for from 1 minute to 10 minutes.

References Cited

UNITED STATES PATENTS

| | | | |
|---|---|---|---|
| 2,306,061 | 12/1942 | Johnston | 99—71 |
| 3,406,074 | 10/1968 | Klein et al. | 99—71 |
| 2,947,634 | 8/1960 | Feldman et al. | 99—71 |
| 2,738,276 | 3/1956 | Blench | 99—71 |
| 3,244,533 | 4/1966 | Clinton et al. | 99—71 |
| 3,421,901 | 1/1969 | Mahlmann et al. | 99—71 |
| 2,845,351 | 7/1958 | Baruch | 99—71 |

FRANK W. LUTTER, Primary Examiner

N. F. GREENBLUM, Assistant Examiner

U.S. Cl. X.R.

426—417